United States Patent Office 3,404,955
Patented Oct. 8, 1968

3,404,955
PROCESS FOR PRODUCING SULFUR TRIOXIDE
AND SULFURIC ACID
Herbert Drechsel, Karl-Heinz Dorr, and Hugo Grimm, Frankfurt am Main, Germany, assignors to Metallgesellschaft Aktiengesellschaft, Frankfurt am Main, Germany
Continuation of application Ser. No. 323,658, Nov. 14, 1963. This application Dec. 28, 1966, Ser. No. 605,501
Claims priority, application Germany, Nov. 16, 1962, M 54,832
4 Claims. (Cl. 23—168)

ABSTRACT OF THE DISCLOSURE

Gases having an $SO_2$ content of less than 9% are catalytically oxidized to $SO_3$ and $H_2SO_4$ in a process in which no external source of heat is employed. A novel combination of heat exchange, oxidation and $SO_3$ absorption steps are employed, including a hot intermediate $SO_3$ absorption step, to provide the heat necessary to conduct the process.

---

Figure 1:
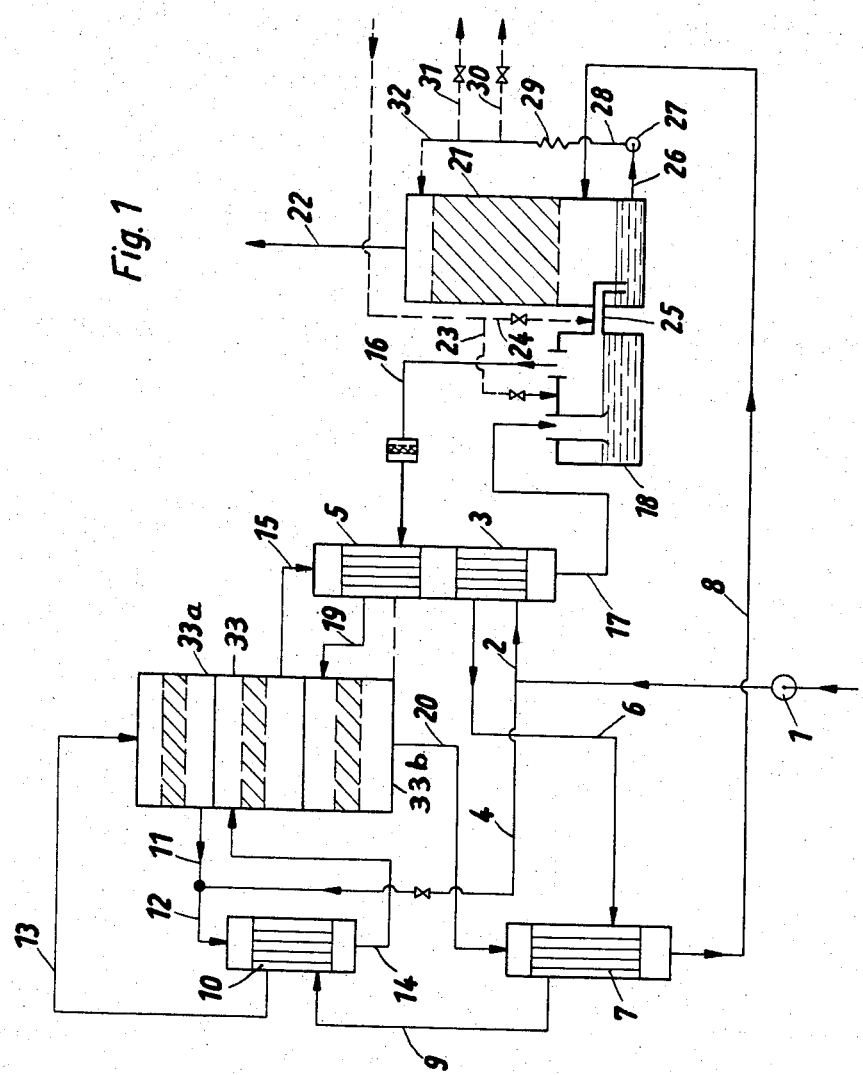

This application is a continuation of Ser. No. 323,658, filed Nov. 14, 1963, and now abandoned.

This invention relates to an improved process for preparing and recovering sulfur trioxide, $SO_3$, and/or sulfuric acid employing improved heat exchange and absorption conditions.

It is known to convert sulfur dioxide containing gases catalytically with oxygen to sulfur trioxide, in either dry or wet processes. In wet processes the resulting sulfuric acid concentration, determined by the water content of the starting gases, is frequently too low for commercial purposes. It is also known to avoid this disadvantage by adding dry sulfur dioxide gases to the wet sulfur dioxide containing gases to be converted. For example, gases from burned sulfur can be added in such amounts that the desired sulfur dioxide to water ratio is produced.

Also, intermediate cooling of the partially converted gases from the first stage of the process in a heat exchanger is known. For example, the process may be carried out in such a manner that the relatively cool sulfur dioxide gases entering at 50° C. are preheated to about 320 to 340° C. in an initial heat exchanger by heat exchange with the catalyzed gases present from the last catalytic stage of the process and are further heated by heat exchange with the precatalyzed gases from the first catalytic stage to the initiating temperature of the conversion.

Also, a process is known wherein the degree of conversion during the catalysis is increased by removing the sulfur trioxide formed from the starting gases by absorption between the individual catalyst stages in order that the equilibrium is displaced. Due to the high sulfur dioxide to sulfur trioxide ratio in the last stage, in comparison with other processes, a very high degree of conversion, up to 99.5%, can be attained in the last catalyst stage. This process, however, as was found, is better, from the standpoint of technical efficiency, only for the conversion of relatively rich sulfur dioxide gases, that is, such as those that have about 9% sulfur dioxide or more. The intermediate absorption causes considerable heat loss, i.e., in the total system, which lowers the exhaust temperature of the final converted gases to such a low point that the heat content of these gases can only be utilized for heating the starting sulfur dioxide gases to conversion initiating temperatures by employing a heat exchanger of uneconomically large dimensions. For example, employing 6% sulfur dioxide gas the final gas of the last stage leaves the final catalyst at a temperature of 420° C.

In order to heat starting gases containing 6% sulfur dioxide, which are at 50° C., with the final gases and the precatalyzed gases from the first catalyst stage to the initiating temperature of 420 to 440° C. in two heat exchangers a total heat exchanger surface of 2020 square meters is necessary, 1800 square meters for the first heat exchanger and 220 square meters for the second heat exchanger. This is for a plant of up to 100 metric tons of monohydrate capacity per day. Whereas, for converting the same gases without the intermediate absorption of sulfur trioxide a total heat exchange surface of only 700 square meters is necessary, namely, 400 square meters for the first heat exchanger and 300 square meters for the second. Suitably the second heat exchanger is subdivided into two or more units so that the temperature level in each stage can be maintained at the optimum value.

For this reason the process having an intermediate absorption of sulfur trioxide has been employed only for gases containing at least 9% sulfur dioxide. If more dilute gases were to be employed, these were first concentrated to at least 9% sulfur dioxide, for example, by the addition of richer sulfur dioxide gases, such as sulfur combustion gases.

This expedient is undesirable in many cases, however, because it not only requires the supplemental use of considerable amounts of relatively expensive raw materials, as elemental sulfur, but also makes a production increase necessary for which often no ready market exists. In this connection it must be borne in mind that the processing of dilute sulfur dioxide gases is customarily only a secondary process of another plant and whose function primarily consists of making troublesome sulfur dioxide containing exhaust gases unharmful and that such process at least causes no loss, and if possible a small income. The necessary enlargement of the plant for such a secondary process caused by an increase in capacity usually does not pay off and it often is difficult to find an adequate market for the resulting by-products.

The present invention comprises a process which also employs a relatively dilute sulfur dioxide gas containing usually less than 9%, for example, down to about 3%, sulfur dioxide with intermediate absorption and productive heat exchange surfaces throughout.

A feature of the invention consists essentially in carrying out the intermediate absorption at relatively high temperature, that is, in the range of 170 to 250° C., preferably at about 200° C. Accordingly, the precatalyzed gas, before the intermediate absorption, is cooled in two steps in a heat exchanger. The temperature to which this gas is cooled in the first heat exchange step is regulated according to the invention such that the heat content of the gas is still adequate to bring the gas freed of sulfur trioxide issued from the hot intermediate absorption to the initiating temperature of the next catalyst stage. Depending in each case upon the activity of the catalyst, the amount of catalyst employed and the sulfur dioxide concentration of the gas, this temperature is about 390° C. to 430° C., generally about 400° C.

It was surprisingly found that the sulfur trioxide can be washed from the gas to such a complete degree at the high absorption temperature used according to the invention that the residual sulfur trioxide has practically no effect on the condition of equilibrium. A total removal of the sulfur trioxide in the intermediate absorption is not necessary since a final absorption is undertaken after the final catalyst stage.

If, for example, gas containing 6% sulfur trioxide is treated and the intermediate absorption is carried out at 200° C., then the gas containing sulfur trioxide ready for intermediate absorption is cooled to about 190° C. Thus the gas freed from sulfur trioxide issuing from the intermediate absorption still has an available temperature of about 200° C. With this temperature distribution the heat content of the gas issuing at about 500° C. from the second catalyst stage is sufficient to heat the washed gases of the same stage from the absorption temperature of 200° C. again to the initiating temperature of the catalyst, 400° C., whereby the hot sulfur trioxide containing gases themselves, at 500° C., are cooled to 310° C.

If, on the other hand, the intermediate absorption is operated at, for example, 250° C. in the treatment of 6% sulfur dioxide gas, then the heat exchange need not be as long since the gas freed of sulfur trioxide is already at the higher temperature of 250° C. and therefore must be brought to the initiating temperature of the catalyst over a smaller temperature differential. In this case, the sulfur trioxide containing gas from the second catalyst stage is cooled to about 360° C.

Moreover, according to the invention the gas to be freed of sulfur trioxide is further cooled in two heat exchange stages and by heat exchange in the second of these stages with the uncatalyzed, cool sulfur dioxide gas cooled to about the operating temperature of the intermediate absorption. Suitably the temperature to which the gas is cooled in the second stage of the heat exchanger is held somewhat lower than the operating temperature of the intermediate absorption because the volume of gas is reduced in the intermediate absorption and therefore not as much gas must be heated again as entered the heat exchanger.

Since it is only necessary to cool to about 200° C. in the second heat exchange stage, the same high temperature differential of about 140 to 150° C. can be maintained between the entering temperature of the cool gas and the exit temperature of the cooled gas. Accordingly, the heat exchanger can be smaller. In this heat exchanger the cool sulfur dioxide gas can simultaneously be preheated from a starting temperature of, for example, 50° C. to about 180° C. to 200° C. in each case according to the temperature range of the intermediate absorption.

According to a preferred feature of the invention the hot absorption is carried out in such a manner that the wash or absorbing acid charged with sulfur trioxide freely overflows into the final absorber. Since only small amounts of sulfur trioxide are held in the final absorber, this absorption can be carried out cold, that is, at about 70 to 100° C. The advantages of this can be seen since only the cool acid of the final absorber, not the hot acid of the hot absorber, must be pumped and cooled.

An apparatus for carrying out the process according to the invention is schematically shown in the accompanying drawings.

FIGURE 1 schematically shows an embodiment of the process of the invention as hereinafter described with particular reference to following Example 1.

Figure 2:
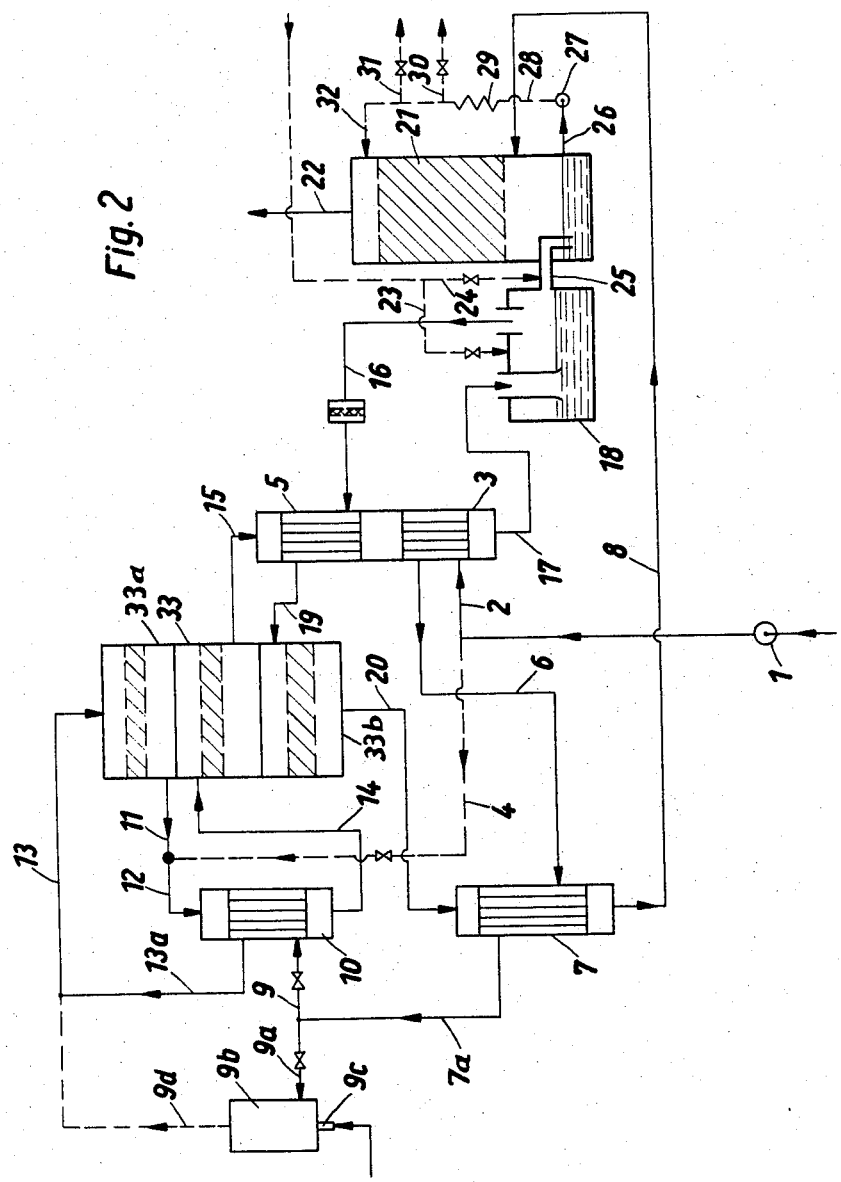

FIGURE 2 schematically shows a second embodiment of the process of the invention with particular reference to following Example 2.

The following examples serve to more clearly describe the process of the invention.

Example 1

The sulfur dioxide starting gas, at a temperature of about 50° C., was forced by pump 1 to lines 2 and 4. A major part of the gas was carried through line 2 into the intermediate heat exchanger 3 and a lesser part through line 4. Of the total amount of 15,800 normal cubic meters per hour of sulfur dioxide containing starting gas, 14,300 normal cubic meters per hour were passed through the intermediate heat exchanger 3 and 1,500 normal cubic meters per hour were passed through line 4. In the intermediate heat exchanger 3, which had about 12.7% of the total effective heat exchange surface, the sulfur dioxide gas was preheated to about 180° C. by heat exchange with hot sulfur trioxide containing gas which had been precooled to about 310° C. by passage through heat exchanger 5 which had about 26.7% of the total heat exchange surface.

The preheated sulfur dioxide gas issued from heat exchanger 3 was passed through line 6 to heat exchanger 7, which had about 48% of the total heat exchange surface, and there preheated to about 350° to 360° C. by heat exchange with the hot sulfur trioxide, at 415° C., issued from the final catalyst stage 33b. The sulfur trioxide gas was cooled from 415° C. to about 225° C. by passage through heat exchanger 7. The sulfur trioxide gas was then carried through line 8 in the final absorber 21.

The sulfur dioxide gas passed from heat exchanger 7 was carried through line 9 into heat exchanger 10, which had 12.6% of the total heat exchange surface, and was heated therein to the catalyst initiating temperature of about 420° to 440° C. by heat exchange with the precatalyzed gas leaving the first catalyst stage through line 11 at a temperature of about 595° C. This precatalyzed gas was mixed with 1500 normal cubic meters per hour of cool starting sulfur dioxide gas entering through line 4 yielding a mixture having a temperature of about 545° C. which entered heat exchanger 10 through line 12.

The sulfur dioxide gas, preheated to the initiating temperature, entered the first catalyst stage 33a through line 13. The precatalyzed gas cooled in heat exchanger 10 to the optimum initiating temperature of the second catalyst stage 33 of about 460° to 470° C. entered this stage through line 14.

The hot catalyzed gas from the second catalyst stage 33 was passed through line 15 at about 500° C. into intermediate heat exchanger 5 wherein it was cooled to about 310° C. by heat exchange with the gas freed from sulfur trioxide which entered through line 16 at a temperature of about 200° C. The precatalyzed gas was additionally cooled to about 190° to 195° C. in connected second intermediate heat exchanger 3 and passed through line 17 into initial absorber 18. The sulfur trioxide was washed from the catalyzed gas by absorption exchange with acid at 200° C. in absorber 18. The gas freed of sulfur trioxide was carried from the absorber 18 through line 16 at about 200° C. and after being heated to the optimum initiating temperature of the third catalyst stage of about 400° C. in heat exchanger 5 was passed through line 19 into the third and final catalyst stage 33b of the catalyst unit. The final catalyzed gas left the catalyst unit through line 20 at a temperature of about 225° C. and was carried through line 8 into the final absorber 21 wherein the sulfur trioxide was washed out by spraying the gas with relatively cold acid at about 60° to 70° C. The gas was then exhausted to the atmosphere through line 22.

The proper absorption concentration and temperature of the acid in absorber 18 was produced through the addition of relatively cold exchange acid through line 23 from a drying recycle not shown. A partial stream of the exchange acid was carried through line 24 into the overflow line 25 between absorbers 18 and 21 according to the requirements of the absorbers.

The hot acid which overflow through line 25 into the sump or bottom of absorber 21 was mixed with the relatively cool acid in the bottom of absorber 21 resulting in a mixture having a temperature of 90° to 100° C. This mixture was carried through line 26, pump 27, line 28 and acid cooler 29 partially through line 30 to another production process not shown and partially through line 31 as exchange acid for a drying recycle also not shown, and the remainder passed through line 32 into absorber 21 for spraying.

According to another particular embodiment of the invention gas was treated which had highly variable but low sulfur dioxide content. This embodiment employed the minimum heat exchange surface which in each instance was necessary according to the highest sulfur dioxide content expected in the starting gas. The heat exchangers according to this embodiment were thus arranged according to the above described process. If the sulfur dioxide content of the starting gas fell below the above limits the heat deficiency in the process arising therefrom was defrayed predominantly through the heat of combustion of elemental sulfur and additionally to a lesser extent by the heat of oxidation of the amount of sulfur dioxide which arose through the burning of sulfur. This feature is described in a copending application of the inventors.

This preferred embodiment of the invention is hereinafter described in Example 2 with particular reference to FIGURE 2 of the accompanying drawings. The example describes an apparatus with reference to a plant having a capacity of 100 metric tons of monohydrate per day, and which may employ a starting sulfur dioxide gas having an expected sulfur dioxide content of 3 to 6%.

Example 2

The process employed a starting gas having 3% sulfur dioxide by volume which was enriched in the process to 3.6% by volume through the burning of sulfur.

The sulfur dioxide containing gas at 50° C. was forced from pump 1 through line 2 into heat exchanger 3. 15,800 normal cubic meters of the starting gas were preheated to about 163° C. in intermediate heat exchanger 3, which had an effective exchange surface of about 12.7% of the total exchange surface, by heat exchange with the hot sulfur trioxide gas at 308° C. already precooled in intermediate heat exchanger 5 passed from the second catalyst stage 33 to the intermediate absorber 18. The preheated sulfur dioxide gas was then passed through line 6 to heat exchanger 7, which had about 48% of the total heat exchange surface and there preheated to about 330° to 340° C. by heat exchange with the sulfur trioxide gas at about 400° C. from the final catalyst stage 33b of the process. The sulfur trioxide gas was cooled thereby in heat exchanger 7 to about 210° C. and was carried through line 8 into the final absorber 21.

A partial stream of 14,020 normal cubic meters per hour of preheated sulfur dioxide was carried through lines 7a and 9 from heat exchanger 7 to heat exchanger 10, which had about 12.6% of the total heat exchange surface. In heat exchanger 10 this partial stream was heated to a temperature of about 380° to 390° C. by heat exchange with the precatalyzed gas which left the first catalyst stage 33a through lines 11 and 12 at a temperature of about 545° C. The preheated sulfur dioxide gas was then carried through line 13a and mixing line 13 into the first catalyst stage 33a.

1780 normal cubic meters of preheated sulfur dioxide gas were passed as the oxygen supply into sulfur furnace 9b for the combustion of sulfur. A relatively small amount of sulfur, about 165 kilograms per hour, was burned in burner 9c. The combustion gas at a temperature of about 900° C. left the sulfur furnace through line 9d and accordingly entered the mixing line 13 wherein a mixture, with the gas admitted through line 13a, was produced having a temperature of about 440° C., the optimum initiating temperature for the first catalyst stage and also a mixture was produced having a concentration of about 3.6% sulfur dioxide by volume.

The precatalyzed gas was cooled to about 495° C. in heat exchanger 10 and entered the second catalyst stage 33 through line 14.

The catalyzed gas from the second catalyst stage 33 at about 500° C. was carried through line 15 into heat exchanger 5 in which it was cooled to about 308° C. by heat exchange with the gas freed of sulfur trioxide admitted through line 16 having a temperature of about 200° C. and additionally cooled in a second connected intermediate heat exchanger 3 to about 190° C. It was then passed through line 17 into initial absorber 18. In this the sulfur trioxide was washed out of the gas in a manner known per se by exchange adsorption with an acid at about 200° C.

The gas freed of sulfur trioxide left the absorber 18 through line 16 at about 200° C. and was passed through intermediate heat exchanger 5 wherein it was heated to the optimum initiating temperature of the third catalyst sage of about 400° C. and passed through line 19 into the final catalyst stage 33b of the catalyst unit.

The final catalyzed gas passed from the final catalyst stage 33b through line 20 at a temperature of about 400° C., was cooled in heat exchanger 7 to about 210° C. and passed through line 8 into the final absorber 21. In the final absorber it was stripped of sulfur trioxide by spraying in a manner known per se with relatively cold acid at about 60 to 72° C. and then exhausted to the atmosphere through line 22.

The proper absorption concentration and temperature of the acid in absorber 18 was produced through the addition of relatively cold exchange acid through line 23 from a drying recycle not shown. A partial stream of the exchange acid was carried through line 24 into the overflow line 25 between absorbers 18 and 21 according to the requirements of the absorbers.

The hot acid which overflowed through line 25 into the sump or bottom of absorber 21 was mixed with the relatively cool acid in the bottom of absorber 21 resulting in a mixture having a temperature of 90° to 100° C. This mixture was carried through line 26, pump 27, line 28 and acid cooler 29 partially through line 30 to another production process not shown and partially through line 31 as exchange acid for a drying recycle also not shown, and the remainder passed through line 32 into absorber 21 for spraying.

When a gas having 6% sulfur dioxide was treated, according to the process set out in Example 2, then a partial stream of 1500 normal cubic meters of the cold starting gas was passed through line 4 and mixed with the gas passed from the first catalyst stage through line 11 at 595° C. resulting in a mixture having a temperature of about 545° C. The mixture was then carried through line 12 into heat exchanger 10. In such a case the added sulfur combustion was not necessary.

Since the apparatus illustrated is adapted for an amount of gas of 15,800 normal cubic meters per hour, corresponding to 100 metric tons of monohydrate per day employing 6% sulfur dioxide gas, the following amounts of sulfur are additionally burned to yield the desired concentration of starting gas:

| Starting gas, percent by volume SO₂ | Amount of sulfur burned, kilograms per hour | SO₂ content before admission to the first catalyst stage, percent by volume SO₂ |
| --- | --- | --- |
| 6.0 | 0 | 6.0 |
| 5.0 | 55 | 5.25 |
| 4.0 | 110 | 4.5 |
| 3.0 | 165 | 3.6 |

We claim:
1. In a process for catalytic conversion of gases containing less than 9% $SO_2$ to an oxidation product selected from the group consisting of $SO_3$, sulfuric acid and mixtures thereof, wherein $SO_2$ containing cool starting gases are purified, dried and then preheated by indirect heat exchange with hot $SO_3$ containing gases before conversion; wherein the resulting preheated $SO_2$ containing gases are catalytically oxidized in initial and final oxidation stages; wherein $SO_3$ formed in the initial oxidation stage is absorbed in a hot intermediate absorption; wherein the $SO_3$ formed n the initial oxidation stage is cooled before entrance into the hot intermediate absorption in an intermediate heat exchange step by indirect heat exchange with gases from the hot intermediate absorption; and wherein $SO_3$ formed in the final oxidation stage is absorbed in a final absorption, the improvement comprising in combination:
(a) employing starting gases containing from 3% to 9% $SO_2$,

(b) cooling the product gas from the initial oxidation stage before admission to the intermediate absorption, which is a one stage absorption in which absorbing acid overflows at a predetermined level into the final absorption, said intermediate absorption operating at a temperature of about 170°–250° C., successively by
   (1) indirect heat exchange with gas issued from the intermediate absorption and
   (2) indirect heat exchange with at least part of the $SO_2$ containing purified and dried starting gases,
(c) the gas leaving the intermediate absorption being heated to the initiating temperature of the final oxidation stage, and
(d) heat required in the process being supplied only by heat exchange of materials within the system.

2. A process as in claim 1 wherein the oxidation product before admission to the intermediate absorption is cooled to 280° to 360° C. in the first heat exchange stage following the initial catalyst stages.

3. A process as in claim 1 wherein the intermediate absorption is carried out by contacting the oxidation product with acid and allowing the liquid product therefrom to freely overflow into a final absorption stage which operates at a lower temperature of 70° to 100° C.

4. A process as in claim 1 wherein the starting gas contains 3% to 6% $SO_2$.

References Cited

UNITED STATES PATENTS

| | | | |
|---|---|---|---|
| 1,930,125 | 10/1933 | Fowler | 23—176 |
| 2,471,072 | 5/1949 | Merriam | 23—175 |
| 3,142,536 | 7/1964 | Guth et al. | 23—175 |

FOREIGN PATENTS

| | | |
|---|---|---|
| 2,368 | 1901 | Great Britain. |

OSCAR R. VERTIZ, *Primary Examiner.*

A. GRIEF, *Assistant Examiner.*